United States Patent

Leonov

(10) Patent No.: US 6,734,588 B2
(45) Date of Patent: May 11, 2004

(54) SECTIONED CONDUCTOR AND RELATED METHODS FOR ACCOMMODATING STRESS AND AVOIDING INTERNAL DEFORMATIONS IN POWER GENERATOR

(75) Inventor: Vladimir Leonov, Oviedo, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 54 days.

(21) Appl. No.: 09/921,083

(22) Filed: Aug. 2, 2001

(65) Prior Publication Data

US 2003/0025419 A1 Feb. 6, 2003

(51) Int. Cl.[7] .............................. H02K 1/00; H02K 2/00; H02K 11/00; H02K 39/08
(52) U.S. Cl. ......................... 310/71; 310/234; 310/179
(58) Field of Search .............................. 310/232, 234, 310/51, 61, 71, 91, 174, 233

(56) References Cited

U.S. PATENT DOCUMENTS

| | | | | |
|---|---|---|---|---|
| 682,898 A | * | 9/1901 | Anderson ................. 310/67 R |
| 2,979,600 A | * | 4/1961 | Silveran ..................... 219/127 |
| 3,014,139 A | | 12/1961 | Shildneck .................... 310/64 |
| 3,508,097 A | | 4/1970 | Zuck .......................... 310/232 |
| 3,686,514 A | * | 8/1972 | Dube et al. ................ 310/232 |
| 4,043,621 A | | 8/1977 | Heinz ........................ 308/189 |
| 4,068,909 A | | 1/1978 | Jacobson et al. .............. 339/5 |
| 4,082,974 A | * | 4/1978 | Yamamoto et al. ......... 310/179 |
| 4,143,290 A | * | 3/1979 | Mizukami et al. .......... 310/270 |
| 4,329,606 A | * | 5/1982 | Montagu ...................... 310/71 |
| 4,334,159 A | | 6/1982 | Ooki et al. ..................... 310/54 |
| 4,347,456 A | | 8/1982 | Chabrerie ................... 310/248 |
| 4,408,140 A | * | 10/1983 | Thompson .................. 310/234 |
| 4,483,574 A | | 11/1984 | Chabrerie et al. .............. 339/5 |
| 4,569,125 A | * | 2/1986 | Antl et al. ..................... 29/596 |
| 4,598,222 A | * | 7/1986 | Matsunaga et al. ......... 310/198 |
| 4,621,211 A | | 11/1986 | Spirk .......................... 310/232 |
| 5,049,771 A | * | 9/1991 | Challita et al. ............. 310/219 |
| 5,561,336 A | | 10/1996 | Girardin ..................... 310/232 |
| 5,627,424 A | * | 5/1997 | Steiner ....................... 310/258 |
| 5,923,114 A | | 7/1999 | Senni ......................... 310/232 |
| 6,030,260 A | * | 2/2000 | Kikuchi et al. ............. 439/890 |
| 6,208,058 B1 | * | 3/2001 | Taji et al. ................... 310/201 |

FOREIGN PATENT DOCUMENTS

JP     406084572 A  *  3/1994

* cited by examiner

Primary Examiner—Burton S. Mullins
Assistant Examiner—Julio C. Gonzalez

(57) ABSTRACT

A sectioned conductor adapted to accommodate stress forces with reduced internal deformation while forming a conductive path between the rotor coils and a radial stud extending into the rotor shaft of a power generator is provided along with related methods. The sectioned conductor is formed of at least two distinct, spaced apart members that remain electrically connected as the second sectioned member moves relative to the first sectioned member in response to stress forces including those arising from centrifugal force caused by the rotation of the rotor shaft within a stator coil, thermal expansion as caused by temperature increases in conductive components of the power generator, and from vibratory motions of the power generator.

5 Claims, 6 Drawing Sheets

SECTIONED CONDUCTOR AND RELATED METHODS FOR ACCOMMODATING STRESS AND AVOIDING INTERNAL DEFORMATIONS IN POWER GENERATOR

FIELD OF THE INVENTION

The field of the invention relates to electrical conductors and, more specifically, electrical conductors in power generation systems subject to stress forces.

BACKGROUND OF THE INVENTION

Conventional power generators generate electrical energy by means of induction. Such generators employ a stator core along with a rotor shaft having rotor coils associated therewith to rotate within the stator core in order to convert mechanical energy into electrical energy. Within the rotor shaft, extending axially relative to the lengthwise extent of the rotor, a pair of axial leads carry electrical current. To electrically connect an axial lead to the rotor coils associated with the rotor shaft, a radial stud often extends from the surface of the rotor shaft into the shaft to connect to the axial lead. A heavy conductor, usually positioned within a slot formed in the rotor shaft, electrically connects the axial lead to the rotor coils (usually the inner coil, which itself is connected electrically to the other coils).

Figure 1:
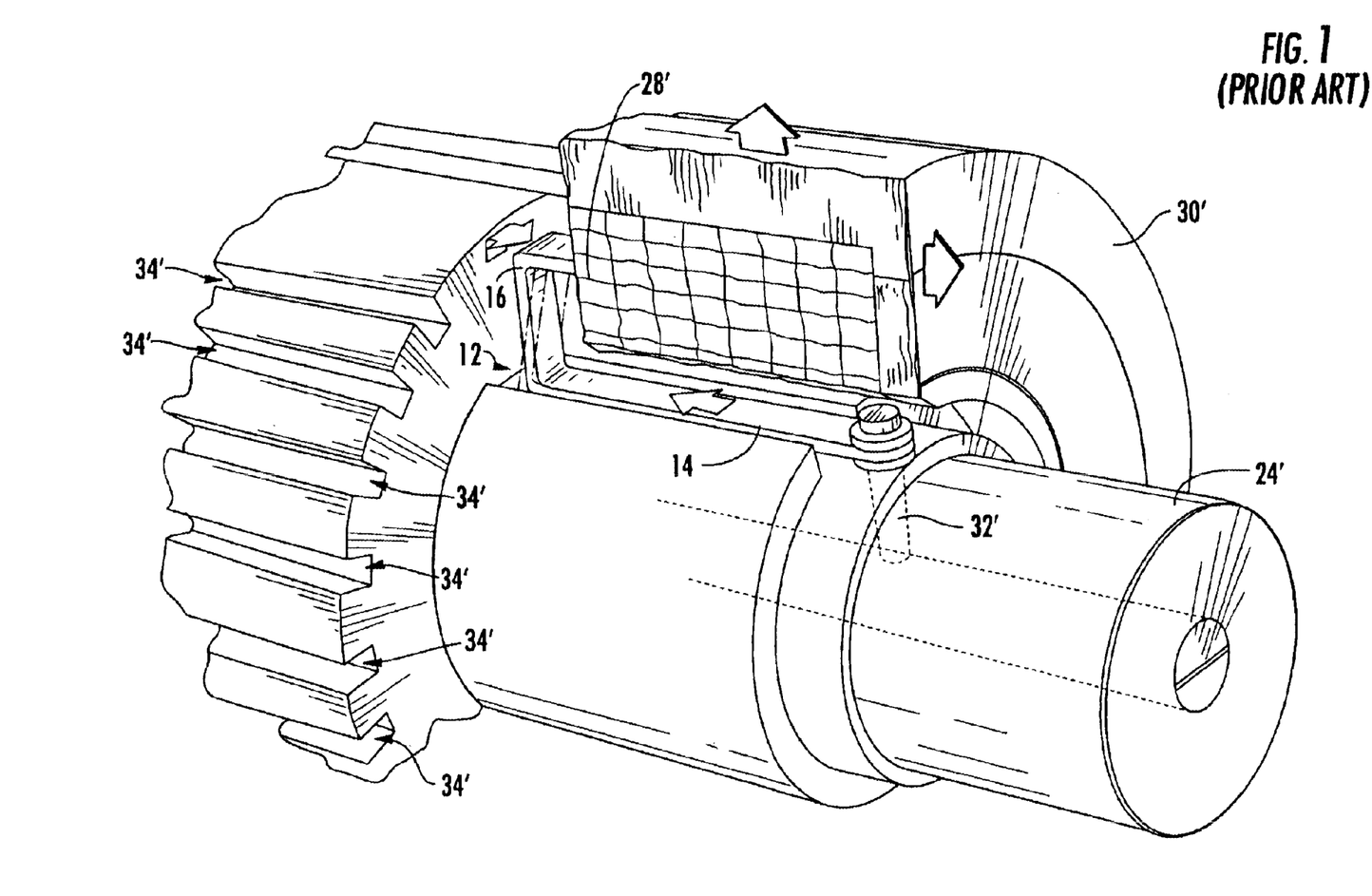
FIG. 1 is a fragmentary perspective view of a conventional J-lead according to the prior art.

These heavy conductors are often referred to as "J-leads" because their shape resembles that of a "J" lying on its side. As illustrated in FIG. 1, the conventional J-lead 12 comprises a straight axial portion 14 connected at one end to the radial stud 32' and extending in an axial direction relative to the rotor shaft 24', and, at the opposite end of the straight portion, a radial portion 16 that extends outward in a radial direction to connect to the rotor coil 28'.

The J-lead conductor 12 often is subject to stress forces stemming from several distinct sources. For example, as the rotor shaft spins within the stator core, centrifugal forces are generated. The rotor coils are positioned within axial slots 34' extending along the length of the rotor shaft 24' and retained therein by a retaining ring 30' surrounding a portion of the rotor shaft 24'. Centrifugal force deflects the retaining ring 30' and tends to pull the rotor coils away from the rotor shaft 24' as it rotates at an extremely rapid speed. The J-lead 12 connected to the inner rotor coil 28' correspondingly experiences a stress force acting in a radial direction relative to the rotor shaft 24' and tending to pull the J-lead 12 radially away from the rotor shaft 24'.

The J-lead also experiences stress forces due to thermal expansions acting in an axial direction relative to the lengthwise extent of the rotor shaft. Because the J-lead and the rotor coils are conductors, electrons move at constant average "drift" velocity through the lead and coils experiencing continual collisions with the atoms of the crystalline structures of the lead and coils. These collisions, of course, generate heat and cause thermal expansions of the J-lead 12 and the rotor coils. Because one end of the axial portion 14 of the J-lead is fixedly connected to the radial stud, thermal expansion of the J-lead often is axially biased, causing the end opposite to the one connected to the radial stud 32' to move farther away from the radial stud 32'. At the same time, thermal expansion of the rotor coil 28' generates a stress force in the opposite direction acting on dint portion 16 of the J-lead that extends outwardly in a radial direction from the rotor shaft 24' and attaches to the coil. As the coil expands, the portion of the J-lead that is attached to the coil is pushed toward the radial stud 32'.

Thus, the net effect of these thermal expansions is that as one part of the J-lead 12 is forced away from the radial stud 32, another part is forced toward the radial stud 32'. The first force is due to a force acting on a first portion of the J-lead 12 positioned close to the rotor shaft, the second force is on a second portion of the J-lead 12 above the first portion and connected to the rotor coil. The result is that medial portions between the first and second portions of the J-lead are subjected to forces causing internal deformation.

In addition to the centrifugal forces due to rotation of the rotor shaft 24' and the deforming forces due to thermal expansion, the J-lead 12 is also subjected to a variety of other forces including those stemming from vibrations within the generator and accentuated by possible pre-stress owing to the manner of installation and manufacturing variations.

In an attempt to accommodate these various forces, J-leads have conventionally been designed and manufactured to purposely permit internal deformation. Some J-leads, for example, are formed by joining in parallel several, reduced-diameter conductors or laminations. A persistent problem, however, is how to find a material that both permits the lead to flex and bend in response to stress forces and also acts as a good conductor. Copper, for example, is a good conductor, but has very poor fatigue properties. In addition, copper is difficult to form multiple parallel conductors into a J-lead and simultaneously provide adequate mechanical support. Components that provide mechanical support and bending capability require tightly controlled tolerances in manufacturing. The parts forming the J-lead must be very carefully assembled in accordance with very complicated procedures.

Not only are these procedures costly, they are fallible no matter how rigorously performed. Firstly, it is extremely difficult to calculate all initial pre-stress factors and J-lead stress forces under different operating conditions. Secondly, it is very difficult to predict how dimensional variations and other factors will influence the stress forces on the J-lead. Indeed, despite complicated attempts to engage in finite element analysis and conduct rigorous fatigue simulations, there continue to be notable J-lead failures.

SUMMARY OF THE INVENTION

In view of the foregoing, the present invention advantageously provides a conductor that substantially avoids internal deformation due to various stress forces on the conductor while providing a conductive path between distinct components of a generator. The substantial avoidance of internal deformation in the conductor makes the failure of the conductor considerably less likely. Specifically, reducing or eliminating entirely internal deformation accordingly reduces the probability of cracks in the conductor structure arising from stress-induced structural fatigue. Hence, a sectioned conductor of the present invention is much more reliable than devices like the conventional J-lead since the internal deformations that can cause fatigue leading to a breakdown are substantially eliminated.

Another distinct advantage of the present invention is the ease and efficiency with which a sectioned conductor according to the present inventor can be manufactured and installed. Instead of requiring intricate manufacturing steps to align and connect multiple, small-diameter conductors into a monolithic J-lead, separate pieces of the sectioned conductor are electrically joined easily and efficiently.

According to the present invention, a sectioned conductor is formed to have at least two sectioned members that remain electrically connected while being able to move relative to each other in response to stress forces. In the context of a power generator, the sectioned conductor includes at least a first sectioned member connected to a radial stud and a second sectioned member connected to at least one rotor coil to thereby provide a conductive path between the radial stud and the rotor coil. In a preferred embodiment, the second sectioned member of the conductor is adapted to respond to centrifugal forced generated by the rotation of the rotor within a stator by moving radially and independently of the remainder of the conductor as the coils and the retaining ring to which they attach move radially away from the rotor in response to the centrifugal force. Yet, as already noted sectioned members remain electrically connected even as the second sectioned member moves relative to the first.

The second sectioned member, moreover, is adapted to move axially in response to thermal expansion of the rotor coil resulting from current-induced temperature rises in the rotor coil. The second sectioned member is also free to move in substantially any direction in response to a combination of axially and radially directed forces such as those stemming from vibratory motions in the rotor.

As explained more fully herein, the present invention also encompasses related methods for reducing or eliminating stress forces in an electrical conductor. More specifically, the present invention provides a method for accommodating stress forces on an electrical connection while providing a conductive path between at least two spaced-apart electrical components within a generator. The method includes positioning a first portion of a conductor so as to electrically connect the conductor to a first component of at least two electrical components, and positioning a second portion of the conductor to electrically connect to a second component. The first and second portions of the conductor, moreover, are adapted so as to permit the second portion to move relative to the first portion in response to stress forces while remaining electrically connected to the first portion. The second portion, more specifically, moves relative to the first so as to substantially avoid internal deformation of the conductor Thus, among the other advantages, the present invention provides a method for providing and maintaining a conductive path with an electrical conductor that is substantially free of stress-induced internal deformation.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments. Also, references similar to FIG. 1 elements described previously will use the same numbers.

Figure 2:
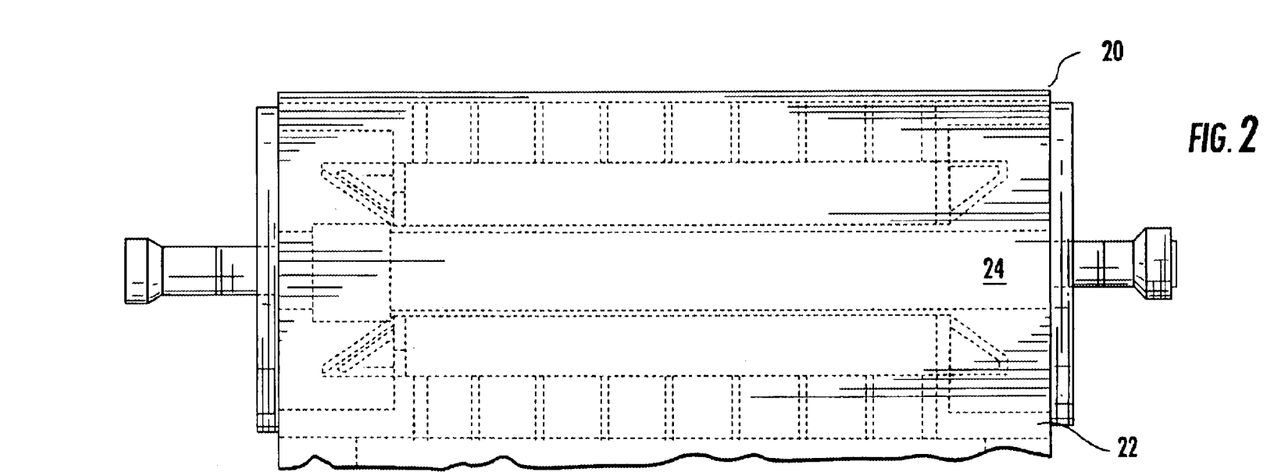
FIG. 2 is a top plan view of an apparatus according to a first embodiment of the present invention.
Figures 3, 4:
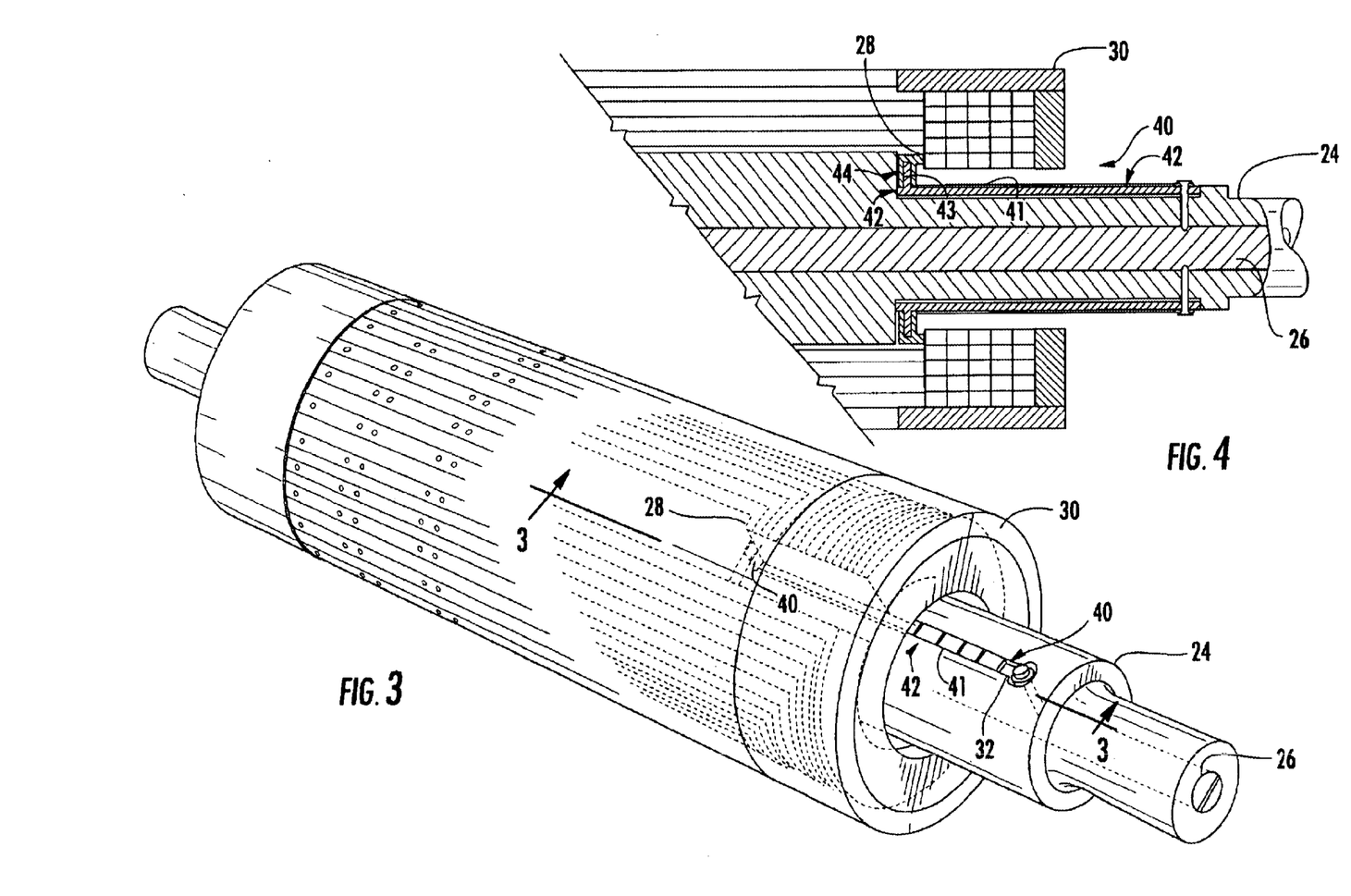
FIG. 3 is a fragmentary sectioned view of a sectioned conductor connected to a rotor coil and radial stud extending into a rotor shaft according to a first embodiment of the present invention.
FIG. 4 is a perspective view of a rotor shaft and a sectioned conductor having a portion phantomed-in for clarity according to a first embodiment of the present invention.

FIGS. 2 through 4 illustrate an apparatus 20 adapted to accommodate stress forces and substantially avoid internal deformation while providing a conductive path in a generator such as a power generator that generates electrical power by electromagnetic induction. The apparatus 20 preferably includes a power generator stator core 22 that provides a high-permeability path for magnetism and a rotor shaft 24 positioned to rotate within the stator core 22. The rotor shaft 24 preferably has at least one axial lead 26 extending axially within the rotor shaft 24 to provide a current path therethrough. Associated with the rotor shaft 24 is at least one rotor coil 28 which also provides a conductive path. The at least one rotor coil 28 preferably is but one of a plurality of such coils. Each of the plurality of coils preferably can be positioned within axially extending slots formed in the rotor shaft 24 and at least partially contained therein by a retaining ring 30 surrounding a portion of the rotor shaft 24.

According to the present invention the apparatus 20 further comprises a sectioned conductor 40. The sectioned conductor 40 connects to a radial stud 32 that extends into the rotor shaft 24 and connects to the axial lead 26. The sectioned conductor 40 also connects to the at least one rotor coil 28 to provide a conductive path between the radial stud 32 and the at least one rotor coil 28, thereby electrically connecting the at least one rotor coil 28 to the axial lead 26. Preferably, the sectioned conductor 40 connects to the inner coil of a plurality of interconnected rotor coils associated with the rotor shaft 24 to thereby provide a conductive path between the at least one axial lead 26 and the plurality of interconnected rotor coils.

During operation of the power generator, the sectioned conductor 40 and the at least one rotor coil 28 undergo thermal expansions at least in part as a result of the heat generated by the electrical current carried by the sectioned conductor 40 and the at least one rotor coil 28. Because the conductor 40 is connected to the radial stud 32, thermal expansion of the conductor 40 is biased away from the radial stud 32. More specifically, as the conductor undergoes thermal expansion, the end of the conductor 40 opposite the radial stud 32 moves farther away from the radial stud 32. Conversely, thermal expansion of the at least one rotor coil 28 is biased toward the radial stud 32 in the sense that the portion of the at least one coil 28 closest to the radial stud 32 moves toward the radial stud 32.

Figure 5A:
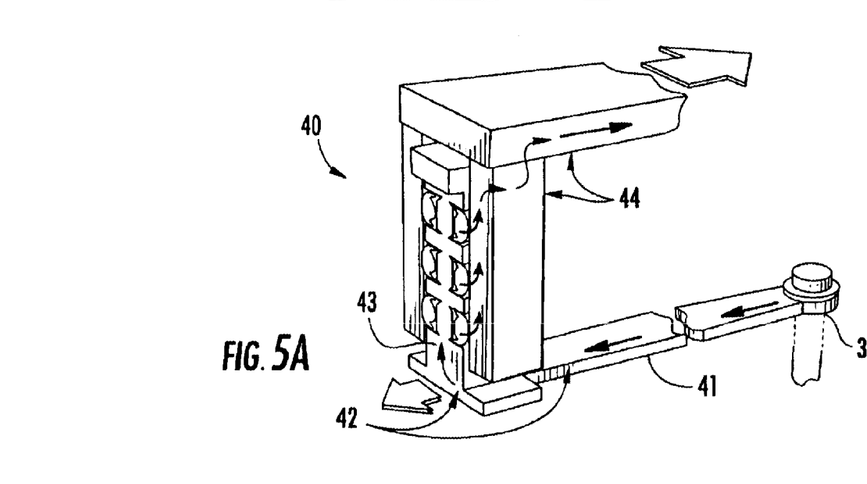
FIG. 5A is a fragmentary perspective view of a sectioned conductor according to a first embodiment of the present invention.
Figure 5B:
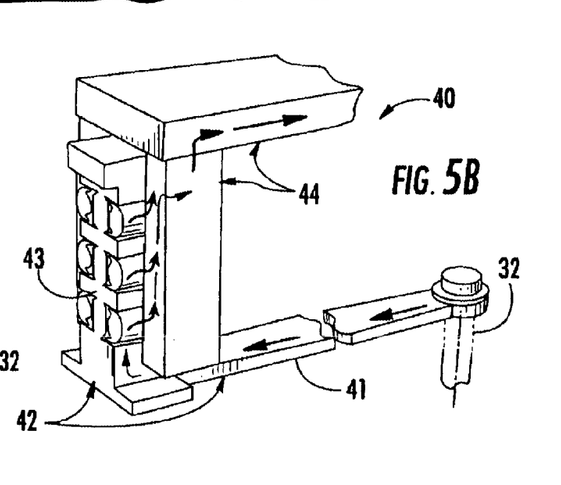
FIG. 5B is a fragmentary perspective view of a sectioned conductor according to a first embodiment of the present invention.
Figure 6:
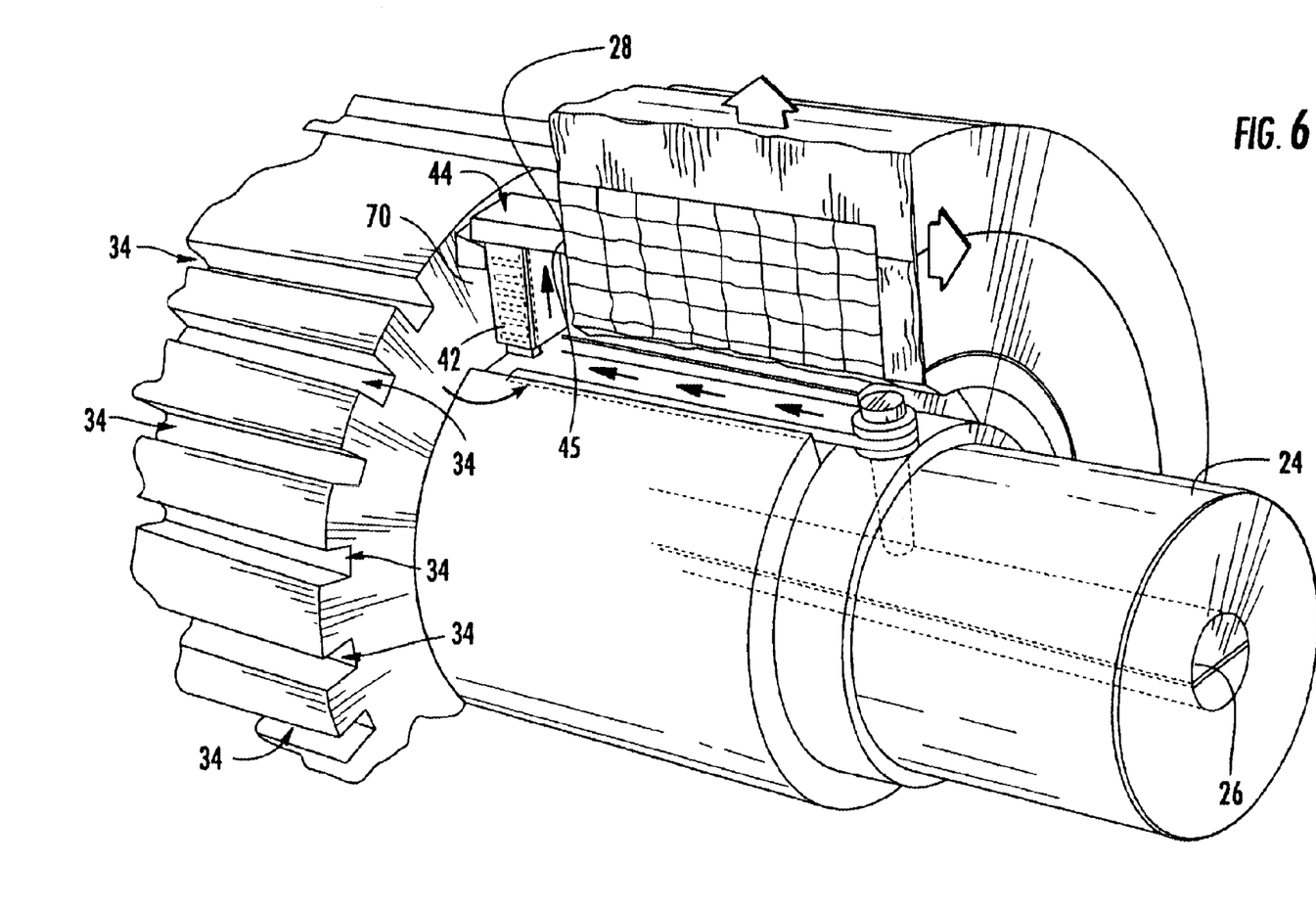
FIG. 6 is a fragmentary perspective view of an apparatus having a sectioned conductor according a first embodiment of the present invention.

The thermal expansions thus generate stress forces in opposite axial orientations at different parts of the conductor 40. As illustrated in FIGS. 5A, 5B, and 6, at the point 45 at which the conductor 40 connects to the at least one rotor coil 28, stress force is oriented toward the radial stud 32 in an axial direction relative to the lengthwise extent of rotor shaft 24. Along an axial portion 41 of the conductor 40 extending from where the conductor 40 connects to radial stud 32, stress force is oriented axially in the opposite direction away from the radial stud 32. Were the conductor integrally formed, as, for example, conventional J-leads are, these forces would cause internal deformation in the conductor. As explained more fully below, however, the sectioned conductor 40 is formed of separate sectioned members that move substantially independently of each other while remaining electrically connected. The sectioned conductor 40 is able to provide a conductive path while substantially or entirely avoiding internal deformation due to stress forces by providing at least two sectioned members that move relative to each other while remaining electrically connected to one another.

An independent source of stress force on the sectioned conductor 40 stems from the centrifugal forces caused by the rotation of the rotor shaft 24 within the stator core 22. The rotation thus causes centrifugally oriented forces on the at least one rotor coil 28 tending to pull the at least one rotor coil 28 away from the rotor shaft 24 in a radial direction relative to the rotor shaft 24. Because the radial stud 32 is positioned within the rotor shaft 24, the portion of the conductor 40 connected to the radial stud 32 tends to resist the centrifugal force resulting from rotation of the rotor shaft 24. The portion of the sectioned conductor 40 connected to the at least one rotor coil 28, however, experiences stress as the at least one coil 28 tends to move away from the rotor shaft 24 in redial direction relative to the rotor shaft 24. Hence, distinct portions of the sectioned conductor 40 experience stress forces directed radially as well as axially relative to the rotor shaft 24. Moreover, mechanical vibrations that result from rotation of the rotor shaft 24 within the stator core 22 inevitably cause vibratory and other stress-inducing motions that are a separate source of stress forces.

As already alluded to above, in order to accommodate these stress forces while avoiding internal deformation, the sectioned conductor 40 preferably comprises at least two sectioned members. As perhaps best shown in FIGS. 5A, 5B, and 6, a first sectioned member 42 connects to the radial stud 32, and a second sectioned member 44 connects to the at least one rotor coil 28. The first sectioned member 42 preferably comprises an axial portion 41 connected to the radial stud 32 and a radial portion 43 extending outwardly from the axial portion 41 in a radial direction relative to the lengthwise extent of the rotor shaft 24. A bore preferably extends into the second sectioned member 44 to thereby define a conductor channel 46 and to receive at least partially therein the radial portion 43 of the first sectioned member 42

Figures 7, 8, 9:
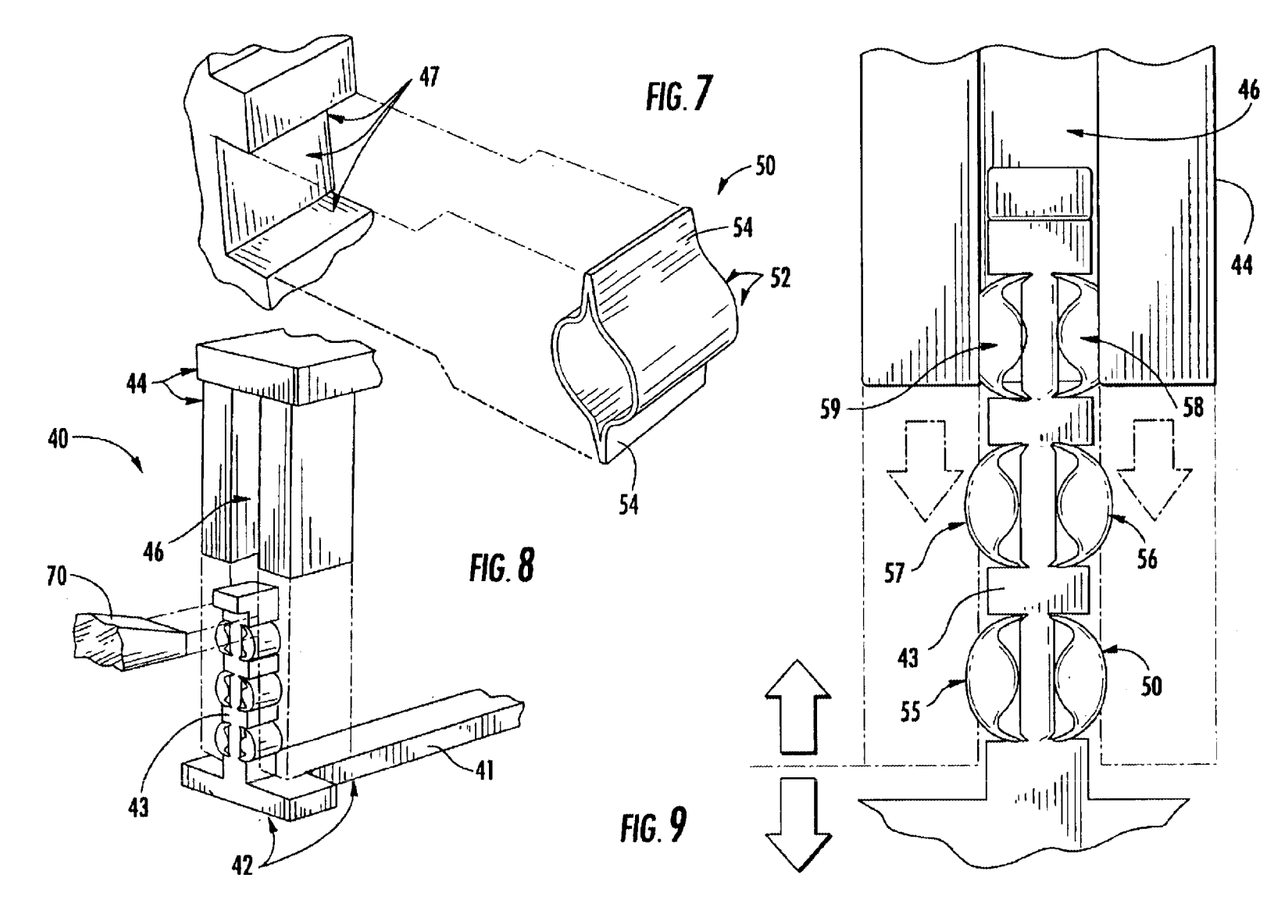
FIG. 7 is an exploded fragmentary perspective view of an elastic conductor positioned in a portion of a sectioned conductor according to a first embodiment of the present invention.
FIG. 8 is an exploded fragmentary perspective view of a sectioned conductor according to a first embodiment of the present invention.
FIG. 9 is a fragmentary sectioned view of a sectioned conductor according to a first embodiment of the present invention.

(See FIG. 8). Although the radial portion 43 of the first sectioned member extends into the conductor channel 46, it nevertheless remains substantially spaced apart from the surface of the conductor channel 46 to thereby avoid inhibiting movement of the second sectioned member 44 relative to the first sectioned member 42 in response to stress forces acting on the sectioned conductor 40.

Although the first and second sectioned members 42, 44 are substantially free from direct contact with each other, having at least a slight air gap between their respective surfaces so as to permit ready movement of the second sectioned member 44 relative to the first sectioned member 42, the sectioned members remain electrically connected. The electrical connection, more specifically, is provided by at least one elastic conductor that is positioned to remain in electrically connected with both sections the second sectioned member 44 moves relative to the first sectioned member 42. The electrical connection, moreover, can be maintained without fixedly connecting the elastic conductor to either section, as explained more fully below. Thus, the present invention provides a unique advantage over conventional devices in which an electrical connection between distinct sections is established only by fixedly connecting a conductor between the sections by brazing or soldering the conductor to each of the sections. The sustainable electrical connection provided by the at least one elastic conductor positioned between the first sectioned member 42 and the second sectioned member 44 allows the sectioned conductor 40 to serve as a conductive path between the at least one rotor coil 28 and radial stud 32 as the second sectioned member 44 moves relative to the first sectioned member 42.

The first sectioned member 42 and the second sectioned member 44 can be electrically connected, for example, by positioning a separate conductor such as a flexible lead or a conductive coil spring between the first and second sectioned members 42, 44 and connecting a first portion of the spring or lead to a surface portion of the first sectional member 42 and a second portion of the spring or lead to a surface portion of the second sectioned member 44. Preferably, as perhaps best illustrated in FIGS. 7–9, the sectioned member 42 and the second sectioned member 44 are electrically connected by at least one strip spring 50. The preferred structure of the strip spring 50 is illustrated explicitly in FIG. 7. As illustrated, the strip spring comprises a substantially annular portion 52 and a pair of flanges 54 extending therefrom. The substantially annular portion 52 of the strip ring 50 can compress and stretch or otherwise contract and expand in response to various stress forces and then readily resume a predetermined shape in the absence of stress forces.

In the context of the present invention, the at least one strip spring 50 preferably is positioned at least partially within at least one notch 47 formed in the radial portion 43 of the first sectioned member 42. The at least one notch 47 can be formed of different shapes and still serve adequately to secure the at least one strip spring 50 therein. For example, the notch can have a standard "V" shape. Alternatively, as specifically illustrated in FIG. 7, the notch can be rectangularly shaped or have other shapes as understood by those skilled in the art. As illustrated in FIG. 9, the at least one slip spring 50, then, fits substantially snugly within the at least one notch 47 and is held in place by the pair of flanges 54 as the inherently elastic property of the partially compressed slip spring 50 causes each of the pair of flanges 54 to press against the right-angled portions of the notch surface. Thus, the strip spring 50 can be maintained in position without fixedly connecting the slip spring 50 to either the first or sectioned members 42, 44 by brazing, soldering, or otherwise effecting a fixed mechanical connection as with conventional devices. A pair of auxiliary notches can be formed, for example, within the right angle portions of the rectangularly shaped notch 47 to further secure therein the pair of flanges 54 substantially holding the slip spring 50 within the notch 47.

As illustrated perhaps more clearly in FIG. 9, the apparatus 20 preferably comprises a plurality of slips springs 50, 55, 56, 57, 58, 59 secured in notches formed in the surface of the radial portion 43 of the first sectioned member 41. Because the radial portion 43 of the first sectioned member 41 extends at least partially into the conductor channel 46 extending into the second sectioned member 44, the space between the radial pardon 43 of the first sectioned member 41 and the surface of the conductor channel 46 can be made sufficiently narrow so as to ensure that at least one of the plurality of the slip springs remains in surface contact with the surface of the conductor channel 46 even as the second sectioned member 44 moves relative to the first sectioned member 42. Thus, as illustrated explicitly in FIGS. 5A, 5B, and 9 the electrical connection between the first sectioned member 42 and the second sectioned member 44 is maintained as the latter moves relative to the former while contact between the surface of the conductor channel 46 and at least one of the plurality of slip springs 50, 55, 56, 57, 58, 59 is maintained. Movement can be axial radial, or any combination of movements.

Even greater degrees of freedom of movement are obtained if the conductor channel 46 extends entirely through a portion of the second sectioned member 44 to thereby define a groove formed in the second sectioned member 44. The width of the conductor channel 46 is preferably greater than the corresponding cross sectional width of the radial portion 43 of the first sectioned member 42. As illustrated perhaps most vividly in FIGS. 5A and 5B, this permits the second sectioned member 44 to move even farther axially relative to the lengthwise extent of the rotor shaft 24. The electrical connection between the first sectioned member 42 and the second sectioned member 44 is maintained provided that the surface of the second sectioned member 44 contacts at least a portion of at least one of the plurality of slip springs 50, 55, 56, 57, 58, 59 positioned in notches in the radial portion 43 of the first sectioned member 42. As illustrated in FIGS. 5A and 5B, the conductor channel 46 thus permits the second sectioned member 44 to move almost completely past the radial portion 43 of the first sectioned member 42 and still remain in electrical contact with the first sectioned member 42, thereby increasing the extent to which the second sectioned member 44 can effectively move axially relative to the lengthwise extent of the rotor shaft 24.

The structural integrity of the apparatus 20 can be enhanced by a structural support 70 positioned to connect to the rotor shaft 24 and extending through the conductor channel 46 in the second sectioned member 44 to connect to the radial portion 43 of the first sectioned member 42 (See FIGS. 6 and 8). So positioned, the second sectioned member 44 is free to move axially and radially relative to the rotor shaft 24 while the support structure 70 extends through the conductor channel 46 to preferably connect fixedly to the radial portion 43 of the first sectioned member 42. The open conductor channel 46 permits the second sectioned member to move without obstruction from the support structure 70 as it extends into the open groove of the second sectioned member 44 of the sectioned conductor 40. The structural support 70 can connect to the rotor shaft 24 at various points.

Preferably, however, because the sectioned conductor can be positioned within in a slot formed in the rotor shaft 24, the structural support 70 connects to a vertical portion of the slot extending upwardly from the rotor shaft 24.

Figures 10, 11:
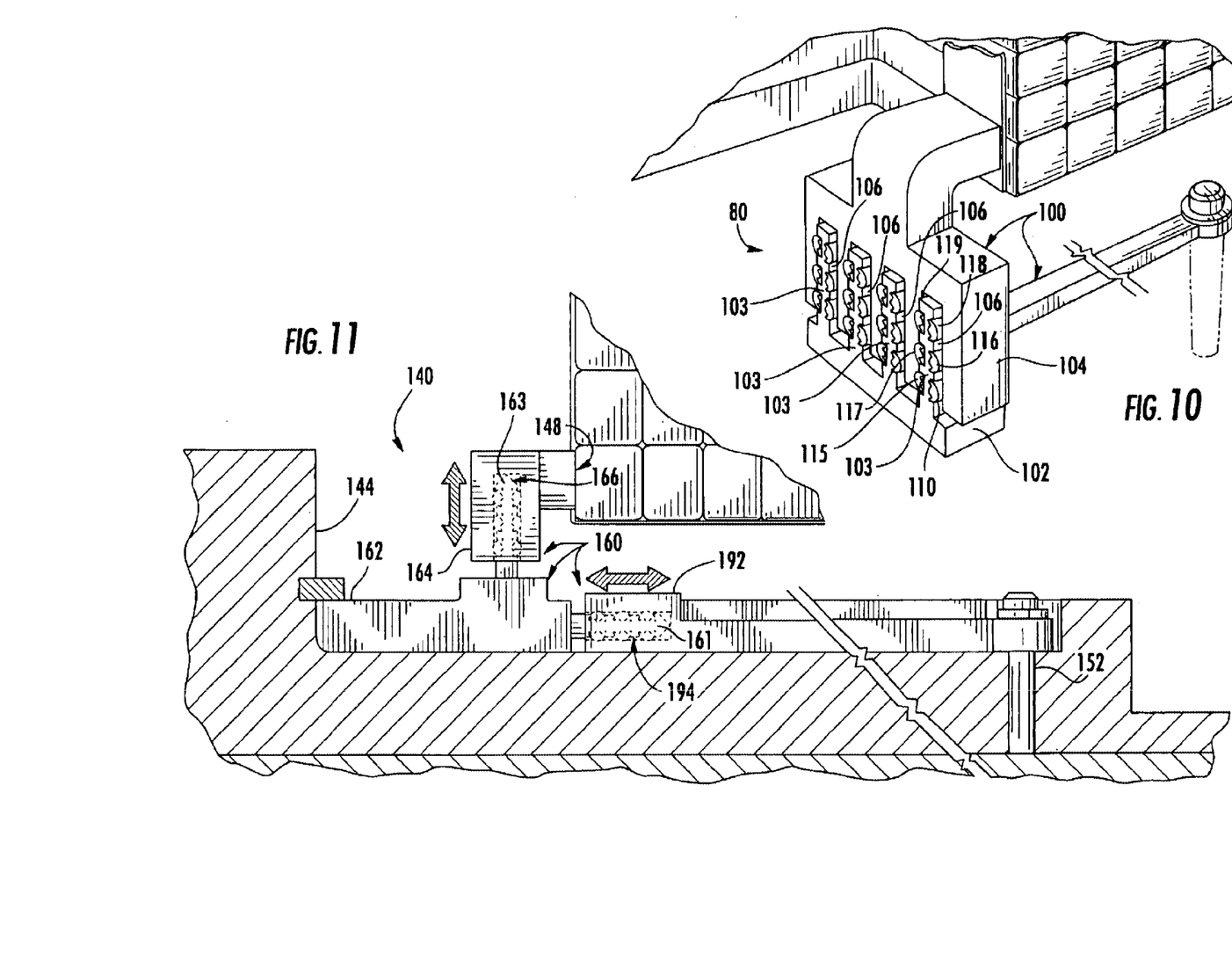
FIG. 10 is a fragmentary perspective view of an apparatus having a sectioned conductor according to a second embodiment of the present invention.
FIG. 11 is a fragmentary perspective view of an apparatus having a sectioned conductor according to a third embodiment of the present invention.

FIG. 10 illustrates a second embodiment of the apparatus 80 having a sectioned conductor 100. As illustrated, the first sectioned member 102 comprises a plurality of radially extending radial portions 103 and a second sectioned member 204 having formed therein a corresponding plurality of conductor channels extending completely through a portion of the surface of the second sectioned member 104 to define a plurality of grooves 106. Moreover, a plurality of strip springs 110, 115, 116, 117, 118, 119 is positioned therein to permit the second sectioned member 104 to move relative to the first sectioned member 102 while remaining electrically connected thereto via the plurality of strip springs 110, 115, 116, 117, 118, 119. At least one support structure can preferably be positioned on the rotor shaft 24 so as to extend through at least one of the plurality of grooves 106 and connect to at least one of the distinct radial portions extending therein.

FIG. 11 illustrates yet a third embodiment of the apparatus 140 in which the sectioned conductor 160 includes a third sectioned member 192 along with first and second sectioned members 162, 164. The first sectioned member 162 is positioned to connect to the rotor shaft 144 and preferably includes an axial portion 161 preferably having a plurality of slip springs positioned in notches formed in die surface of the axial portion 161. The first sectioned member 162 further includes a radial portion 163, also preferably having a plurality of slip springs positioned in notches formed in the surface of the radial portion 163. The second sectioned member 164 is positioned to connect to at least one rotor coil 148 and preferably includes a bore defining a second sectioned conductor channel 166 extending into the second sectioned member 164 and positioned to at least partially receive therein the radial portion 163 of the first sectioned member 162. As illustrated, the third sectioned member 192 is connected to the radial stud 152 extending into the rotor shaft 144. The third sectioned member 192 preferably includes a third sectioned conductor channel 194 into which the axial portion 161 of the first sectioned member 162 extends.

The sectioned conductor 160, so formed, permits the second and third sectioned members 164, 192 of the sectioned conductor to move relative to the first sectioned member 162 in response to stress forces. The first, second, and third sectioned members remain electrically connected through contact maintained between the plurality of slip springs contacting surface portions of the second sectioned conductor channel 166 and the third sectioned conductor channel 194. Accordingly, the sectioned conductor 160 provides a conductive path between the radial stud 152 and the at least one rotor coil 148 and is able to accommodate stress forces while substantially avoiding internal deformation.

FIGS. 1 through 11 also illustrate various method aspects of the present invention. The method aspects include a method for accommodating stress forces on an electrical connection while providing a conductive path between at least two spaced-apart electrical components within a generator. The method includes positioning a first portion 42 of a conductor 40 to electrically connect the first portion 42 to a first electrical component, positioning a second portion 44 of the conductor 40 to electrically connect the second portion to a second electrical component. The respective portions of the conductor 40 are specifically positioned to permit the second portion 44 to move relative to the first 42 in response to stress forces so as to thereby substantially avoid internal deformation of the conductor while also allowing the first and second portions 42, 44 to remain electrically connected to each other.

The method can further include electrically connecting the first portion 42 of the conductor 40 to the second portion 44 of the conductor 40 by positioning at least one electrically conductive slip spring 50 or other elastic conductor between the first portion 42 and the second portion 44 of the conductor 40 thereby providing a conductive path via the at least one slip spring 50 or other elastic conductor. In addition, the method can include reducing current-induced temperature effects in the conductor 40 by forming the first portion 42 of a material having a low ohmic resistance and forming the second portion 44 of a material also having a low ohmic resistance. Yet further, the method also can include providing enhanced structural support 70 to the conductor 40 by positioning a support structure 70 on a third component of the generator and connecting the support structure to the first portion of the conductor.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That claimed is:

1. A sectioned conductor for accommodating stress forces with substantially reduced internal deformation while providing a conductive path between a rotor coil and a radial stud in a power generator, the sectioned conductor comprising:

a first sectioned member connected to the radial stud; and a second sectioned member electrically connected to the first sectioned member and adapted to remain electrically connected thereto when moving relative to the first sectioned member in response to stress forces to thereby reduce internal deformation of the sectioned conductor, wherein the first sectioned member comprises an axial portion adapted to be connected to the rotor shaft and to the radial stud extending into the rotor shaft and a radial portion extending outwardly from the axial portion in a radial direction relative to the lengthwise extent of the rotor shaft, and wherein the second sectioned member comprises a first end adapted to be connected to the at least one rotor coil and a second end through which a bore extends thereby defining a substantially hollow conductor channel having at least three sides to at least partially receive therein the axial portion of the first sectioned member.

2. A sectioned conductor as defined in claim 1, wherein the radial portion of the first sectioned member is electrically connected to the second sectioned member by at least one strip spring having a first connection connected to a surface of the conductor channel into which the radial portion of the first member at least partially extends and having a second opposing connection connected to the radial portion of the first sectioned member of die elastic conductor.

3. A sectioned conductor as defined in claim 2, wherein the first sectioned member and the second sectioned member are each formed of a material having low ohmic resistance to thereby reduce current-induced temperature effects in the sectioned conductor when the sectioned conductor conducts electrical current between the radial stud and the at least one rotor coil.

4. A sectioned conductor as defined in claim 3, wherein the sectioned conductor further comprises a structural support having a first end connected to the first sectioned member of the sectioned conductor and a second end connected to the rotor to which the first sectioned member of the sectioned conductor is connected to thereby provide enhanced mechanical support to the sectioned conductor.

5. A sectioned conductor as defined in claim 4, wherein the sectioned conductor further comprises an open groove extending through a portion of the second sectioned of the sectioned conductor, a portion of the first sectioned member of the sectioned conductor extending into the groove and being electrically connected to a surface portion of the groove and the first end of the structural support extending in to the groove and fixedly connecting to the portion of the first sectioned member positioned therein such that the second sectioned member is able to move relative to first section freely and unobstructed by the first end of the support structure in response to stress forces.

* * * * *